3,201,506
ADDITION OF MAGNESIUM SILICATE TO A POLYESTER IN THE MANUFACTURE OF ORIENTED FILM

William Douglas Bills, Circleville, Ohio, assignor to E. I. du Pont de Nemours and Company, Wilmington, Del., a corporation of Delaware
No Drawing. Filed Aug. 9, 1962, Ser. No. 215,793
4 Claims. (Cl. 264—210)

This invention relates to an improved process for preparing polymeric linear terephthalate ester films and more particularly to a process for improving gauge of polyethylene terephthalate film by the inclusion in the polymer of hydrated magnesium silicate.

Many types of thermoplastic polymer films must be oriented, by stretching and/or rolling in one or two directions, to be converted into useful materials. Polyethylene terephthalate is a typical example of this type of material, and the process of the present invention, although applicable to similar types of thermoplastic polymer films, will be described with particular reference to polyethylene terephthalate film.

Polyethylene terephthalate film in its oriented form possesses may unique and desirable characteristics such as enhanced physical, chemical, and electrical properties. More particularly, polyethylene terephthalate film which has been oriented by stretching and/or rolling to substantially the same extent in both the longitudinal and transverse directions exhibits a substantial degree of balance in its tensile properties. Such oriented polyethylene terephthalate film is ideally suited for a great variety of end uses in the packaging, electrical, and decorative fields.

One method for the production of oriented polyethylene terephthalate film is disclosed in U.S. Patent 2,823,421 to Scarlett. In this process, substantially amorphous polyethylene terephthalate film is stretched in both the longitudinal and transverse directions, e.g., between 2.5 and 3.25 times the original dimensions of the film, to produce an oriented film. This film is first stretched in the longitudinal direction over a series of differential speed rolls and idler rolls at a temperature of 80 to 95° C. The film is then stretched (preferably to about the same extent as in the longitudinal direction when an essentially balanced tenacity is desired), in the transverse direction in a tenter frame at 85 to 95° C. The film is then heat-treated at elevated temperatures (150 to 200° C.) in an extension of the tenter frame to render the film dimensionally stable.

This method has several serious drawbacks. In the process for stretching substantially amorphous polyethylene terephthalate and like thermoplastic "cast" film or "as-cast" film in two directions, utilizing the above-described method, gauge variations in the cast film, resulting from minute non-uniformities in the extrusion orifice, are amplified by stretching the film, and in many cases the final gauge variation of the stretched film is intolerable even though initially the "as-cast" film was within acceptable limits.

Film gauge variations measured in the transverse direction, i.e., in a direction transverse to the direction in which the film is extruded, present a serious problem in winding up the film to obtain acceptable roll formation. For example, thick sections which are formed in longitudinal paths in a continuous length of film, give rise to wound rolls having surfaces which are very hard below the thick sections and consequently are soft below the thin sections. Such rolls have a tendency to telescope in winding and unwinding operations as well as in transit. Furthermore, it is difficult to maintain and even tension on film having high gauge variations, and this makes slitting difficult. Moreover, film having a relatively high gauge variation is also difficult or impossible to handle in various types of converting equipment, such as bag-making machines. Such films of variable gauge do not work well in various pieces of commercial equipment such as cameras and photographic projectors, and in sound recording equipment where a film tape is employed.

It is an object of this invention to provide an improved process for preparing polymeric linear terephthalate ester films.

It is a further object of this invention to provide a process for improving gauge of polyethylene terephthalate film by the inclusion in the polymer of hydrated magnesium silicate.

It is a still further object of this invention to provide a process for preparing transparent and smooth surfaced polyethylene terephthalate film having enhanced gauge uniformity by the inclusion in the polymer of hydrated magnesium silicate. These and other objects will appear hereinafter.

These and other objects of this invention are accomplished by the improved process of preparing a polymeric linear terephthalate ester film wherein an alkyl ester of terephthalate acid having from 1 through 7 carbon atoms in the alkyl group is reacted with a polymethylene glycol having from 2 through 10 carbon atoms under conditions whereby ester interchange is effected, the ester is subsequently polymerized, extruded into the form of a thin film and the film molecularly oriented by elongating said film in both the longitudinal and transverse directions to an extent of at least 2.0 times its original dimensions while being heated to a temperature within the range of 80 to 160° C., the improvement comprising: adding to said ester prior to polymerization from 1 through 5% by weight, based on the weight of said alkyl ester of terephthalic acid, of hydrated magnesium silicate having particle sizes within the range of 2 to 10 microns.

The process of the present invention provides a novel and efficient method for preparing oriented polyethylene terephthalate films having materially enhanced gauge uniformity and, more particularly, the material enhancement of gauge uniformity as measured in the direction transverse to that in which the film was extruded. Briefly stated, the process of the present invention comprises incorporating into the polyethylene terephthalate polymerization process after the completion of the ester interchange reaction between ethylene glycol and dimethyl terephthalate and prior to the final polymerization, particulate hydrated magnesium silicate (talc) and thereafter polymerizing the reaction mass, extruding into film form, and orienting the thus formed film by means of elongation in both the longitudinal and transverse directions. The ester interchange process is described in U.S. Patent 2,465,319 to Whinfield and Dickson.

The resulting film which is essentially transparent and smooth surfaced, exhibits substantially enhanced uniformity of gauge.

It is well-known in the art to incorporate into polymeric substances, either prior to polymerization or during extrusion while the polymer is still in the molten state, particulate matter for the purpose of obtaining an opaque or colored film having a roughened (matte), delustered surface which is ideal for printing, tracing, or various surface treatments. Particulate matter employed for such purposes have included calcium carbonate, calcium silicate, carbon black, mica, glass, titanium dioxide, barium titanate, kaolin, calcium sulfate, etc.

Unexpectedly it has been discovered that when from 1 to 5% by weight (based on the weight of dimethyl terephthalate) of finely divided magnesium silicate (talc) having a particle size ranging between 2 to 10 microns is incorporated into the polymerization process at a point just prior to polymerization, and the film subsequently formed is elongated in both directions, an essentially transparent, non-delustered film having a smooth surface which will not accept pencil or pen markings is obtained. Even more unexpectedly, a substantial improvement in gauge uniformity (particularly in the transverse direction) is realized. As mentioned hereinbefore, the amount of particulate talc which can be added to the reaction products of the ester interchange reaction between dimethyl terephthalate and ethylene glycol (essentially bis-2-ethyl hydroxy terephthalate) can vary between 1 to 5%. Preferably between 2 to 4% by weight based on the weight of dimethyl terephthalate is incorporated into the monomeric mixture. The particle size can range between 2 to 10 microns with 3.5 to 6 microns being preferred. The particulate material can be added to the monomeric mixture in the form of a dispersion in ethylene glycol or as a dry powder directly into the products of the ester interchange reaction.

After completing the polymerization, the polymer is then extruded into film form. The film thus formed, is then elongated in both the longitudinal and transverse directions, usually by stretching operations such as described in U.S. Patent 2,823,421 to Scarlett or U.S. Patent 2,995,779 to Winter, to an extent varying between 2 to 6.0 times its original dimensions. Preferably, in order to obtain the physical property level necessary for most commercial applications, the film is stretched in both directions to an extent of at least 3.0 times its original dimensions in both directions. The temperatures to which the film is subjected during the elongation process will range between 80 to 160° C., with the usual temperatures employed ranging between 93 to 98° C.

The following examples will serve to illustrate the practice and principles of the present invention.

EXAMPLES I TO IV

The data in Table I was collected from measurements made upon polyethylene terephthalate film prepared in accordance with the continuous process briefly described as follows: Ethylene glycol and dimethyl terephthalate were continuously fed into the top of an ester-interchange column. Methanol was continuously removed from the top of the column and bis-2-hydroxy ethyl terephthalate was withdrawn from the bottom of the column. The ester interchange and polymerization catalysts (zinc acetate and antimony trioxide) were fed to the ester-interchange column with the reactants, i.e., with the ethylene glycol and dimethyl terephthalate. The hydrated magnesium silicate in the form of a dry powder was added into the liquid product of the ester interchange. The bis-2-hydroxy ethyl terephthalate continuously fed into a "prepolymerization" column was then continuously fed into a mixer-type of reactor which effected more complete polymerization to produce polymer of the desired intrinsic viscosity. Thereafter, the polymer was continuously extruded into film form. The film (approximately 10 mils thick) thus formed was heated to a temperature of 95° C., and was continuously stretched longitudinally and then transversely to an extent of three times (×) the original dimensions and heat-treated at 200° C. while held under tension to restrict dimensional change. The thickness of the resulting biaxially stretched film was approximately 1 mil.

To serve as control examples, samples of polyethylene terephthalate film were prepared in a manner similar to that described above with the exception that no particulate matter was added to the polymeric melt.

Table I below lists the example number, the percent particulate matter (based on the weight of dimethyl terephthalate employed in the preparation of the polymer), the particle size of the particulate matter, and the standard deviation magnification ratio (SDMR).

The standard deviation magnification ratio (SDMR) is defined as:

$$\text{SDMR} = \frac{\text{Standard deviation of the stretched film}}{\text{Standard deviation of the cast film}} \times (\text{L.D. stretch ratio} \times \text{T.D. stretch ratio})$$

The stretch ratio factor allows a value of 1.0 to be established as the value at which the gauge variation remains the same during stretching. As the ratio decreases toward 1.0, more gauge uniformity is present. The gauge of the film was determined with an Ames gauge first on the film before and after stretching at the points where the lines of an original one-half inch grid pattern crossed. The gauge measurements were then used to determine the standard deviation of points before and after stretching.

Table I

GAUGE CHARACTERISTICS OF ORIENTED POLYETHYLENE TEREPHTHALATE FILMS HAVING INCORPORATED THEREIN PARTICULATE MAGNESIUM SILICATE

| Example Number | Percent Particulate Magnesium Silicate in Polymer | Particle Size (Microns) | Standard Deviation Magnification Ratio (SDMR) |
|---|---|---|---|
| 1 | 2.5 | 6 | 1.53 |
| 2 | 2.5 | 6 | 1.43 |
| 3 | 2.5 | 6 | 1.48 |
| 4 | 2.5 | 6 | 1.43 |
|   |   |   | [1] 1.47 |
| A. Control |   |   | 1.91 |
| B. Control |   |   | 1.85 |
| C. Control |   |   | 1.77 |
| D. Control |   |   | 1.77 |
|   |   |   | [2] 1.83 |

[1] Average SDMR Ex's. 1–4.
[2] Average SDMR Control Ex's. A–D.

As can be seen from Table I, the samples of film having magnesium silicate incorporated therein show a substantial improvement in gauge over the control films. Additionally these films displayed a smooth, non-delustered surface of acceptable clarity.

EXAMPLES 5–17

Samples of oriented polyethylene terephthalate film were prepared in a manner similar to that described in Examples 1–4. The extruded film was heated to a temperature of 95° C., stretched 3.0× in both the longitudinal and transverse directions, and heat-treated at 220° C. Incorporated into the polymer were magnesium silicate particles. To serve as control examples and to illustrate the criticality of utilizing magnesium silicate, samples of oriented polyethylene terephthalate film were prepared in a manner similar to that described hereinbefore with the exception that (a) calcium silicate particles, (b) calcium carbonate particles and (c) no particulate matter were substituted for the particulate magnesium silicate.

Table II below lists the example number, the type particulate matter included, the particle size, and the SDMR.

Table II
ORIENTED POLYETHYLENE TEREPHTHALATE HAVING PARTICULATE MATTER INCORPORATED THEREIN

| Ex. No. | Particulate Matter Included in Polymer | Percent Particulate Matter Included in Polymer | Particle Size (average) | Standard Deviation Magnification Ratio (SDMR) |
|---|---|---|---|---|
| 5 | Magnesium Silicate | 2.5 | [1] 3.5 | 1.82 |
| 6 | ----do---- | 2.5 | [1] 3.5 | 1.32 |
| 7 | ----do---- | 2.5 | [1] 3.5 | 1.95 |
| 8 | ----do---- | 2.5 | [1] 3.5 | 1.30 |
|   |   |   |   | [2] 1.60 |
| 9 | Calcium Silicate | 2.5 | 4 | 2.59 |
| 10 | ----do---- | 2.5 | 4 | 2.92 |
| 11 | ----do---- | 2.5 | 4 | 3.12 |
| 12 | ----do---- | 2.5 | 4 | 2.29 |
|   |   |   |   | [3] 2.83 |
| 13 | Calcium Carbonate | 5 | 2.5 | 3.14 |
| 14 | ----do---- | 5 | 2.5 | 3.19 |
| 15 | ----do---- | 5 | 2.5 | 2.88 |
| 16 | ----do---- | 5 | 2.5 | 2.49 |
|   |   |   |   | [4] 2.92 |
| 17 | None | | | 4.16 |
| 18 | ----do---- | | | 3.14 |
| 19 | ----do---- | | | 3.08 |
|   |   |   |   | [5] 3.46 |

[1] Maximum Size.
[2] Average SDMR Ex.'s. 5–8.
[3] Average SDMR Ex.'s 9–12.
[4] Average SDMR Ex.'s. 13–16.
[5] Average SDMR Ex.'s. 17–19.

From Table II, it can be seen that the gauge, as represented by the standard deviation magnification ratio measurements, for the samples having magnesium silicate particles incorporated therein are significantly improved over those samples having other types of particulate matter incorporated within the structure or no particulate matter. Of equal significance is the fact that the films prepared with the calcium silicate and calcium carbonate particles incorportaed therein had a roughened surface (matte finish), whereas the films prepared utilizing magnesium silicate as the particulate matter had a smooth, glossy surface with an acceptable level of transparency.

The process of the present invention allows for the preparation of oriented polyethylene terephthalate film which not only exhibits enhanced gauge uniformity in addition to the physical, chemical, and electrical properties characteristic ofsuch film in its oriented form, but which also has a smooth, non-opaque surface.

Quite surprising and unexpected are the facts (contrary to the result when particulate fillers shown in the art are added to ethylene terephthalate polymer) that (1) a striking improvement in overall gauge uniformity results and (2) an opaque roughened matte finish does not result.

What is claimed is:

1. In a proces of preparing a polymeric linear terephthalate ester film wherein an alkyl ester of terephthalic acid having from 1 through 7 carbon atoms in the alkyl group is reacted with a polymethylene glycol having from 2 through 10 carbon atoms under conditions whereby ester interchange is effected, the ester is subsequently polymerized, extruded into the form of a thin film and the film molecularly oriented by elongating said film in both the longitudinal and transverse directions to an extent of at least 2.0 times its original dimensions while being heated to a temperature within the range of 80 to 160° C., the improvement comprising: adding to said ester prior to polymerization from 1 through 5% by weight, based on the weight of said alkyl ester of terephthalic acid, of hydrated magnesium silicate having particle sizes within the range of 2 to 10 microns.

2. In a process of preparing a polyethylene terephthalate film wherein dimethyl terephthalate is reacted with ethylene glycol under conditions whereby ester interchange is effected, the ester is subsequently polymerized, extruded into the form of a thin film and the film molecularly oriented by elongating said film in both the longitudinal and transverse directions to an extent of from 3.0 to 6.0 times its original dimensions while being heated to a temperature within the range of 85 to 100° C., the improvement comprising: adding to the ester prior to polymerization from 2 through 4% by weight based on the weight of said dimethyl terephthalate, of hydrated magnesium silicate having particle sizes within the range of 3.5 to 6 microns.

3. The process of claim 2 wherein said hydrated magnesium silicate has an average particle size of 3.5 microns and 2.5% by weight of said silicate, based on the weight of said dimethyl terephthalate, is added to the ester prior to polymerization.

4. The process of claim 2 wherein the film is heat-treated at a temperature within the range of 150 to 250° C. while restricting dimensional change of said film.

References Cited by the Examiner

UNITED STATES PATENTS 2,995,779  8/61  Winter.
3,002,942  10/61  Zoethbrood.

ALEXANDER H. BRODMERKEL, *Primary Examiner.*
LESLIE H. GASTON, *Examiner.*